(12) United States Patent
Tsalmon

(10) Patent No.: US 10,735,513 B2
(45) Date of Patent: Aug. 4, 2020

(54) REMOTE NVME ACTIVATION

(71) Applicant: Toshiba Memory Corporation, Minato-ku, Tokyo (JP)

(72) Inventor: Shimon Tsalmon, Kfar-Saba (IL)

(73) Assignee: Toshiba Memory Corporation, Tokyo (JP)

( * ) Notice: Subject to any disclaimer, the term of this patent is extended or adjusted under 35 U.S.C. 154(b) by 657 days.

(21) Appl. No.: 15/259,825

(22) Filed: Sep. 8, 2016

(65) Prior Publication Data

US 2018/0069923 A1    Mar. 8, 2018

(51) Int. Cl.
*H04L 29/08* (2006.01)
*G06F 15/173* (2006.01)
*G06F 15/167* (2006.01)

(52) U.S. Cl.
CPC ........ *H04L 67/1097* (2013.01); *G06F 15/167* (2013.01); *G06F 15/17331* (2013.01)

(58) Field of Classification Search
CPC ............. G06F 15/167; G06F 15/17331; H04L 67/1097
See application file for complete search history.

(56) References Cited

U.S. PATENT DOCUMENTS

| 7,149,823 B2 | 12/2006 | Miller et al. |
| 7,917,903 B2 | 3/2011 | Lumb et al. |
| 8,539,130 B2 | 9/2013 | Glasco et al. |
| 9,015,426 B2 | 4/2015 | Stabrawa et al. |
| 9,996,262 B1* | 6/2018 | Nemawarkar ........ G06F 3/0604 |
| 2006/0064405 A1 | 3/2006 | Jiang et al. |
| 2008/0215796 A1* | 9/2008 | Lam .................... G06F 9/44505 711/100 |
| 2012/0311208 A1 | 12/2012 | Manula et al. |
| 2013/0191590 A1* | 7/2013 | Malwankar ........... G06F 3/0611 711/114 |
| 2013/0198311 A1* | 8/2013 | Tamir .................... G06F 15/167 709/212 |

(Continued)

OTHER PUBLICATIONS

Qiumin Xu et al., "Performance Analysis of NVMe SSDs and their Implication on Real World Databases," SYSTOR '15, May 26-28, 2015, Haifa, Israel.

(Continued)

*Primary Examiner* — Joe Chacko
(74) *Attorney, Agent, or Firm* — White & Case LLP

(57) ABSTRACT

A method of accessing a remote storage subsystem from a host device separate from the remote storage subsystem and connected via interfaces to a data communications topology is disclosed. In one embodiment, the communications interface comprises an RDMA network fabric. In one embodiment, the method includes queuing a write command or a read command in a submission queue of the remote storage subsystem, and placing a write data into a memory of the remote storage subsystem. The method further includes transmitting a message to the remote storage subsystem indicating the write command or the read command has been submitted in the submission queue, and detecting a command completion status from a completion queue of the remote storage subsystem. The method further includes transmitting a message to the remote storage subsystem indicating the command completion status has been detected.

26 Claims, 7 Drawing Sheets

(56) References Cited

U.S. PATENT DOCUMENTS

| | | | | |
|---|---|---|---|---|
| 2014/0173149 A1* | 6/2014 | Walker | ................ | G06F 9/45533 |
| | | | | 710/263 |
| 2014/0317219 A1 | 10/2014 | Fitch et al. | | |
| 2015/0012735 A1* | 1/2015 | Tamir | .................... | G06F 9/4416 |
| | | | | 713/2 |
| 2015/0134857 A1* | 5/2015 | Hahn | ...................... | G06F 3/061 |
| | | | | 710/5 |
| 2015/0248366 A1* | 9/2015 | Bergsten | ............ | H04L 67/1097 |
| | | | | 710/308 |
| 2016/0127492 A1* | 5/2016 | Malwankar | ......... | H04L 67/2842 |
| | | | | 709/212 |

OTHER PUBLICATIONS

D. Minturn, "NVM Express Over Fabrics," Intel Corp. OFADevWorkshop, 11th Annual International Open Fabrics Software Developers' Workshop, Mar. 15-18, 2015, pp. 1-13.
D. Minturn et al., "Under the Hood with NVMe over Fabrics," SNIA Ethernet Storage Forum, Dec. 15, 2015, pp. 1-47.
D. Minturn, "nvm Express," Revision 1.0, Intel Corp., Jun. 5, 2016, pp. 1-49.

* cited by examiner

REMOTE NVME ACTIVATION

FIELD OF THE INVENTION

The present invention generally relates to remotely activating a storage subsystem from a host device over a communications interface.

BACKGROUND OF THE INVENTION

NON-VOLATILE MEMORY EXPRESS (NVMe) is a device interface specification that allows non-volatile storage media to use the PCI EXPRESS (PCIe) interface of a host computer system. Non-volatile storage media typically comprises flash memory, and comes in the form of solid-state drives (SSDs). NVMe allows for reduced latency, higher data transfer bandwidth, and reduced power consumption as compared to legacy interfaces such as SATA.

Modernly, there is a trend to disaggregate storage devices from the host system, where the host and storage device reside in different systems and are connected via network interfaces to a communications network topology, such as a switched network fabric comprising network nodes interconnected via one or more network switches. In order to maintain high performance and low latency over a switched network fabric, REMOTE DIRECT MEMORY ACCESS (RDMA) may be used. RDMA allows direct access to the memory of one computer system to another, without involving either's operating system, or CPUs, where the computer systems are equipped with RDMA-enabled Network Interface Cards (RNICs). This reduces the overhead and permits high-throughput, low-latency networking.

FIG. 1 is a block diagram of a host device 102 accessing a storage device 116 over an RDMA network fabric 112, according to the prior art. In operation, to perform a write or a read operation, the host device 102 sends an encapsulated command that can be un-encapsulated by the storage device 116 over the RDMA network fabric 112. After the storage device 116 receives the encapsulated command, the storage device 116 decapsulates the command and parses it to determine if the command is a write command or a read command. If the command is a write command, the storage device 116 retrieves the data to be written from the host device 102 using an RDMA_READ command. After the data is written, the storage device 116 then encapsulates a response and sends it to the host device 102 via RDMA messaging notifying the host device 102 that the data has been written to the storage device 116. Similarly, if the command is a read command, the storage device 116 reads the data and sends it to the host device 102 using an RDMA_WRITE command. Again, after the read data is transmitted to the host device 102, the storage device 116 encapsulates a response and sends it to the host device 102 via RDMA messaging.

As shown and described in FIG. 1, aspects of legacy storage remain in current NVMe over fabric applications. Namely, the storage device 116 is still responsible for parsing in coming commands from and encoding responses to the host device 102, managing the data transfer between the host device 102 and the storage device 116, and the NVMe driver operations. As a result, the computational demand on the storage device 116 is very high. In a typical network storage environment where multiple host devices seek to access the storage device, the storage device becomes a bottleneck as it quickly runs out of processing bandwidth to handle the multiple host devices resulting in slow performance. Moreover, there is no ability to scale out the storage device to allow hundreds or thousands of host devices to access the storage device at the same time.

What is needed, therefore, is an improved desegregated storage environment that reduces load from the storage device over a network fabric and allows for an enhanced topology that can scale out to thousands of host devices to a single storage device.

BRIEF DESCRIPTION OF THE INVENTION

In one embodiment, a host device capable of being connected to a remote storage subsystem separate from the host device via a data communications network topology includes a host controller communicatively coupled to a host memory. In one embodiment, the data communications network topology comprises an RDMA network fabric. In one embodiment, the host controller is configured to queue a write command or a read command in a submission queue of the remote storage subsystem. The host controller is further configured to transmit a message to the remote storage subsystem indicating the write command or the read command has been submitted in the submission queue, and cause the host memory to place a write data into a memory of the remote storage system. The host controller is yet further configured to obtain a read data from the memory of the remote storage subsystem, detect a command completion status from a completion queue of the remote storage subsystem, and transmit a message to the remote storage subsystem indicating the command completion status has been detected.

In one embodiment, the host controller detects the command completion status by polling the completion queue of the remote storage subsystem. In another embodiment, the host controller detects the command completion status by receiving a completion message from the remote storage subsystem. In one embodiment, the host controller transmits the messages to the remote storage subsystem by writing registers of the remote storage subsystem. In another embodiment, the host controller transmits the messages to the remote storage subsystem using a Remote Procedure Call (RPC).

In one embodiment, a remote storage subsystem capable of being connected to a host device separate from the remote storage subsystem via a communications interface includes a storage controller communicatively coupled to a storage device having a Controller Memory Buffer (CMB). In one embodiment, the communications interface comprises an RDMA network fabric. In one embodiment, the storage device is capable of operating according to the NVMe standard. In one embodiment, the storage device is communicatively coupled to the storage controller via a PCIe interface.

In one embodiment, the storage controller is configured to receive a message indicating a pending read or write command has been queued in a submission queue of the remote storage subsystem from the host device. The storage controller is further configured to fetch the write command or the read command from the submission queue of the remote storage subsystem. The storage controller is further configured to process the write command by writing a write data to the storage device, and to process the read command by placing a read data into the memory of the storage device. The storage controller is yet further configured to update a completion queue of the remote storage subsystem with a command completion status after processing the write command or the read command and receive a message indicating the command completions status has been detected by the host device.

In one embodiment, the storage controller is further configured to send a completion message to the host device after processing the write command or read command. In one embodiment, the submission queue and the completion queue reside in the memory of the storage device. In another embodiment, the submission queue and the completion queue reside in a memory buffer of the storage controller. In one embodiment, the messages sent to the host device comprise a register write. In another embodiment, the messages comprise an RPC.

In one embodiment, a method of accessing a remote storage subsystem from a host device separate from the remote storage subsystem and connected via a communications interface includes queueing a write command or a read command in a submission queue of the remote storage subsystem. The method further includes placing a write data into a memory of the remote storage subsystem and retrieving a read data from the memory of the remote storage subsystem. The method further includes transmitting a message to the remote storage subsystem indicating the write command or the read command has been submitted in the submission queue. The method further includes detecting a command completion status from a completion queue of the remote storage subsystem and transmitting a message to the remote storage subsystem indicating the command completion status has been detected.

In one embodiment, the communications interface comprises an RDMA network fabric. In one embodiment, the method further includes receiving a completion message from the remote storage subsystem indicating that the write command has been processed. In one embodiment, detecting the command completion status comprises polling the completion queue. In another embodiment, detecting the command completion status comprises receiving a completion message from the remote storage subsystem. In one embodiment, transmitting the messages comprises writing registers of the remote storage subsystem. In another embodiment, transmitting the messages comprise sending an RPC to the remote storage subsystem.

DETAILED DESCRIPTION OF THE INVENTION

Figure 2:
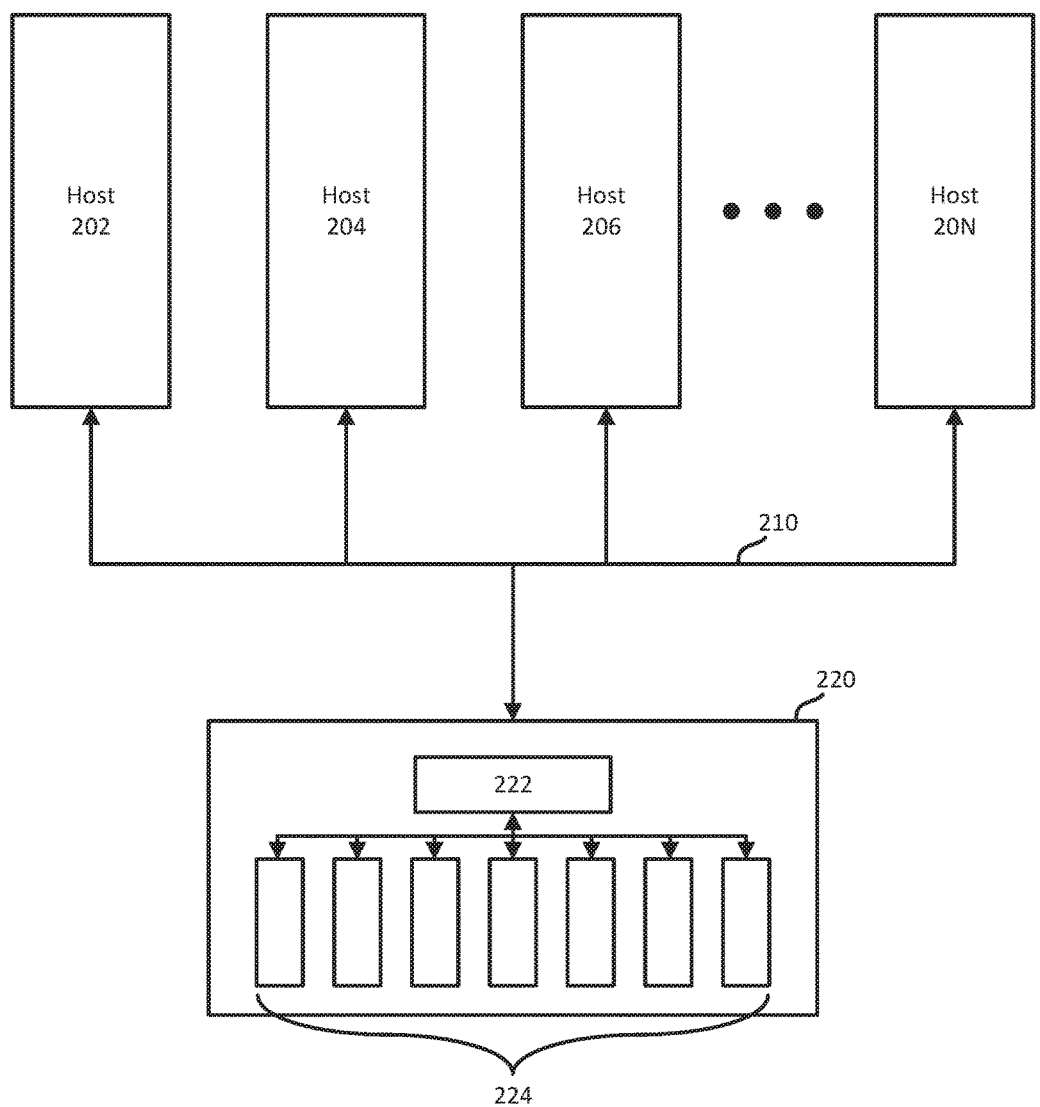
FIG. 2 is a block diagram of a plurality of host devices connected to a remote storage appliance over an RDMA network fabric, according to one embodiment of the invention.

FIG. 2 is a block diagram of a plurality of host devices 202, 204, 206, ..., 20N connected to a remote storage appliance 220 over an RDMA network fabric 210, according to one embodiment of the invention. As shown in FIG. 2, the storage appliance 220 comprises a plurality of storage devices 224 communicatively coupled to a controller 222. In one embodiment, the plurality of storage devices 224 are capable of operating according to the NVMe standard. In one embodiment, the plurality of storage devices 224 are non-volatile storage media comprising flash memory. In one embodiment, the plurality of storage devices 224 are SSDs. While a plurality of storage devices 224 are shown in FIG. 2, in one embodiment, the storage appliance 220 may comprise a single storage device 224 communicatively coupled to the controller 222. In one embodiment, the storage devices 224 are communicatively coupled to the controller 222 via a PCIe interface.

RDMA network fabric 210 is used to connect the remote storage appliance 220 and the plurality of host devices 202, 204, 206, ..., 20N because it enables the direct transfer of data to or from application memory, eliminating the need to copy data between application memory and the data buffers in the drivers for the storage devices 224 or network stack of the operating systems running on the host devices 202, 204, 206, ..., 20N. Such transfers require no work be done by the CPUs, caches, or context switches (not shown) of the host devices 202, 204, 206, ..., 20N or the storage appliance 220, and data transfers continue in parallel with other system operations. When an application performs an RDMA read or write command, the application data is delivered directly between the memories of the host devices 202, 204, 206, ..., 20N and the storage appliance 220 via the RDMA network fabric 210, under the control of RNICs at either end of the fabric (i.e., one at each host device 202, 204, 206, ..., 20N, and one at the storage appliance 220), reducing latency and enabling fast and efficient data transfer.

There are a number of RDMA-based storage transport protocols, including INTERNET SMALL COMPUTER SYSTEMS INTERFACE (iSCSI) Extensions for RDMA (iSER). RDMA is commonly provided by (i) the Transmission Control Protocol (TCP) with RDMA services (INTERNET WIDE AREA RDMA PROTOCOL (iWARP)), (ii) RDMA OVER CONVERGED ETHERNET (RoCE), or (iii) INFINIBAND. The RDMA network fabric 210 may be compatible with any suitable RDMA-based storage transport protocol.

Figure 3:
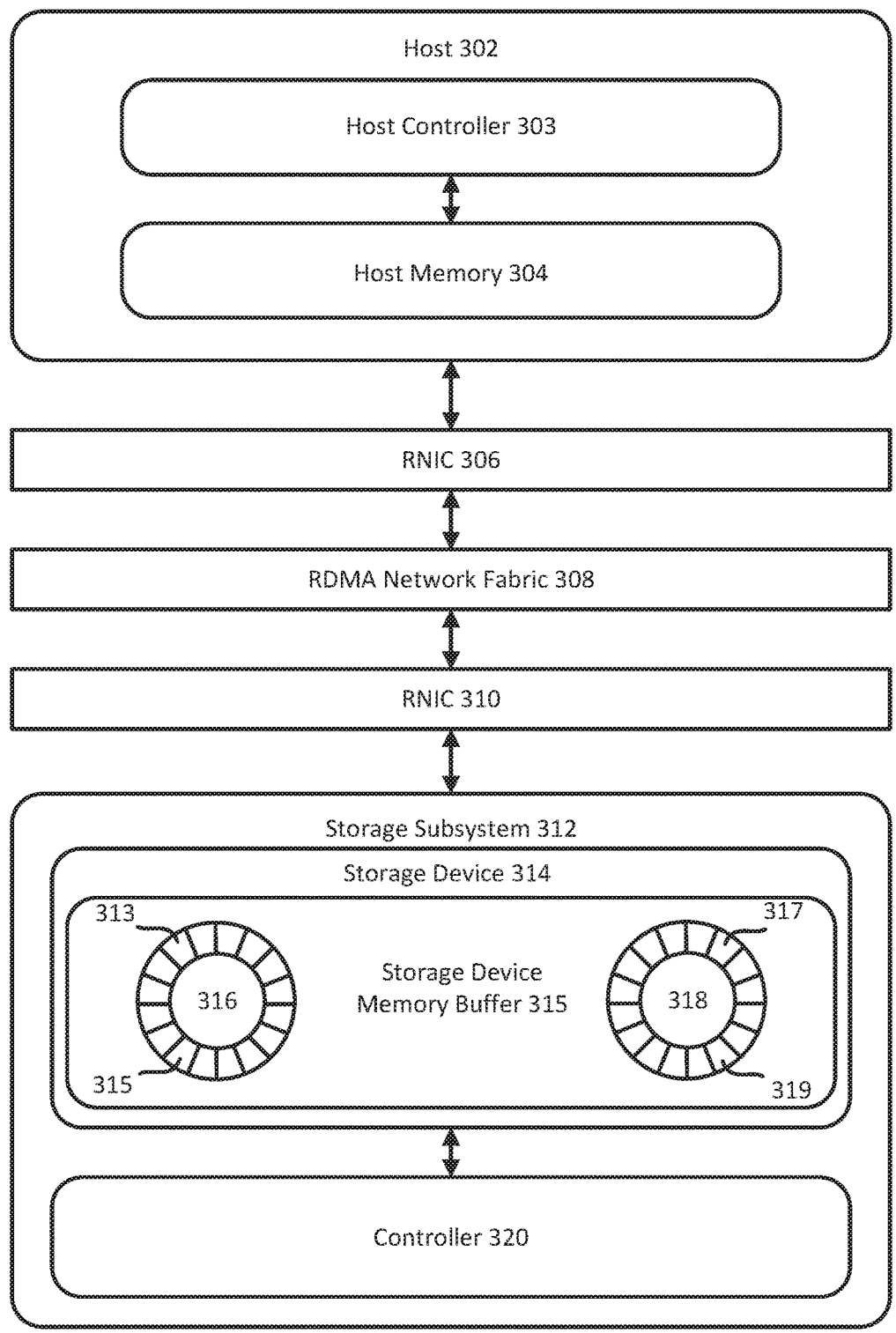
FIG. 3 is a block diagram of a host device accessing a remote NVMe subsystem over an RDMA network fabric, according to one embodiment of the invention.

FIG. 3 is a block diagram of a host device 302 accessing a remote storage subsystem 312 over an RDMA network fabric 308, according to one embodiment of the invention. In this configuration, the host device 302 may also be referred to as the initiator, and the remote storage subsystem 312 may also be referred to as the target. As shown in FIG. 3, the host device 302 includes a host controller 303 coupled to a host memory 304. On either side of the RDMA network fabric 308 is an RNIC 306 (host device 302 side) and an RNIC 310 (storage subsystem 312 side) to facilitate "zero-copy" networking between the host device 302 and the storage subsystem 312 over the RDMA network fabric 308.

"Zero-copy" refers to computer transfer operations where the CPU (either at the host device 302 or the remote storage subsystem 312) does not have to perform an additional task of copying data from one memory buffer to another. In this instances, an RDMA-enabled RNIC 306 may transfer data directly received from the RDMA network fabric 308 to a memory of the storage subsystem 312 (such as memory buffer 315) without the need for an intermediate copy operation by the CPU of the host device 302 via a memory of the host device 302 (such as host memory 304). The host device 302 may comprise any suitable computer system having an operating system running applications reading and writing data to the storage subsystem 312, such as a personal computer or workstation. For simplicity, only one host device 302 is shown in FIG. 3. In other embodiments, a plurality of host devices 302 may be connected to the storage subsystem 312, as illustrated in FIG. 2, for example.

The storage subsystem 312 includes a storage device 314 having a submission queue 316 with a head register 313 and a tail register 315, and a completion queue 318 with a head register 317 and a tail register 319. The submission queue 316 is a circular buffer with a fixed slot size that allows the host device 302 to submit commands for execution by the NVMe storage device 314. The head register 313 and the tail register 315 correspond to the one to n commands pending in the submission queue 316. The completion queue 318 is a circular buffer with a fixed slot size used to post the statuses for completed commands for the host device 302. The completion queue 318 includes a head register 317 and a tail register 319 correspond to the one to m pending statuses for completed commands not yet detected and processed by the host device 302.

In one embodiment, the submission queue 316 and the completion queue 318 reside within a memory buffer 315 of the storage device 314. The storage subsystem 312 also includes a controller 320 communicatively coupled to the storage device 314. In one embodiment, the NVMe controller 320 is communicatively coupled to the NVMe storage device 314 via a PCIe interface. The storage device 314 may comprise any suitable non-volatile flash-based storage media. In one embodiment, the storage device 314 is an SSD. In one embodiment, the storage device 314 is capable of operating according to the NVMe standard. The storage subsystem 312 can be a part of a storage appliance, such as the storage appliance 220 shown in FIG. 2.

Figure 4:
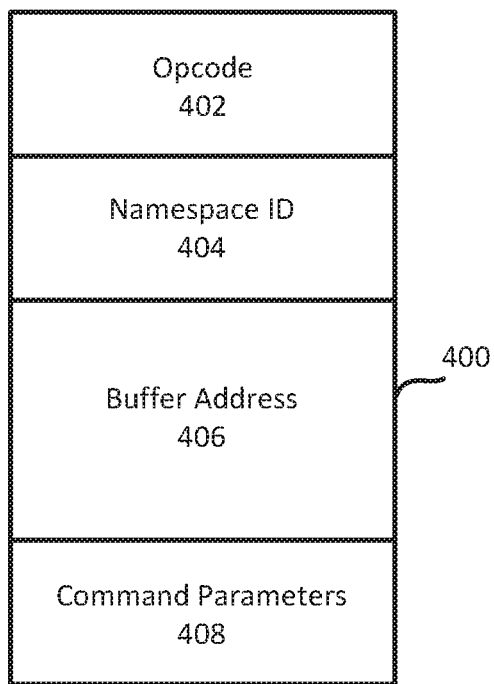
FIG. 4 is a block diagram of a submission queue entry, according to one embodiment of the invention.

In operation, the host controller 303 of the host device 302 queues a write or a read command in the submission queue 316 of the storage device 314. The format of the submission queue 316 entry is shown in FIG. 4, and described below. If the command is a write command, the host controller 303 places a write data to be written from the host memory 304 into the memory buffer 315 of the storage device 314. In one embodiment, this is accomplished using an RDMA_WRITE command. The host controller 303 then sends a message to the controller 320 indicating a command has been queued in the submission queue 316. This process is also known as "ringing a doorbell" of the submission queue 316 for the command. In one embodiment, this can be done by writing the registers of the controller 320 via the RDMA. In another embodiment, this can be done using an RPC.

Figure 5:
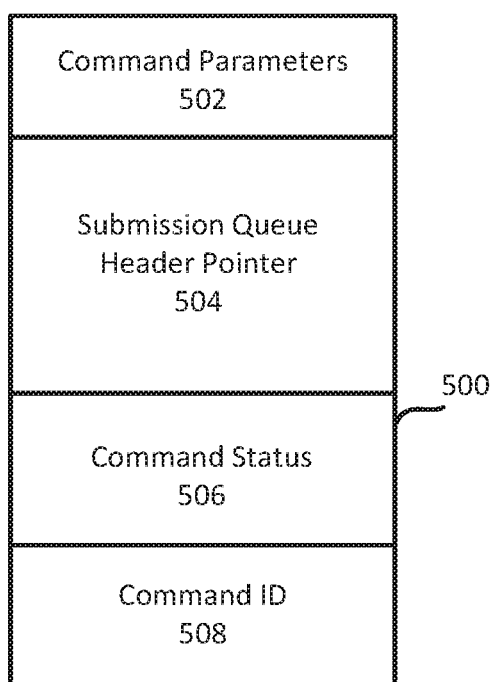
FIG. 5 is a block diagram of a completion queue entry, according to one embodiment of the invention.

The controller 320 then fetches the command from the submission queue 316 and processes the command. If the command is a read command, the controller 320 places the corresponding read data from a persistent memory (not shown) of the storage device 314 into the memory buffer 315 of the storage device 314. If the command is a write command, the controller 320 writes the write data from the memory of the storage device 314 to a persistent memory of the storage device. After the write command or the read command has been processed by the controller 320, the controller 320 queues a completion status in the completion queue 318 for the host controller 303 to detect. The non-binding format of the completion queue 318 entry is shown in FIG. 5, and described below. In one embodiment, the host controller 303 detects the completion status by polling the completion queue 318. In another embodiment, the controller 320 sends a completion message to the host controller 303 that the completion status has been queued in the completion queue 318.

If the command is a read command, the host controller 303 reads the read data from the memory buffer 315 of the storage device 314. In one embodiment, this is accomplished using an RDMA_READ command. The host controller 303 then, after the host device 302 has successfully read the data, sends a message to the controller 320 indicating that the completion status has been detected (i.e. the host controller 303 rings a doorbell of the completion queue 318).

Figure 1:
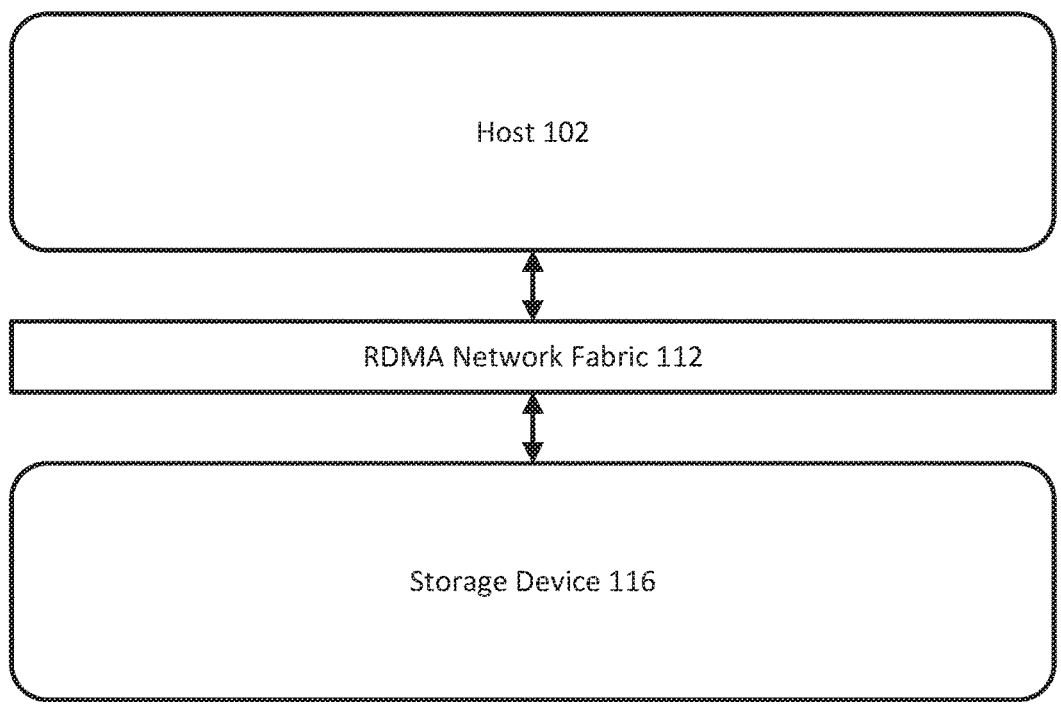
FIG. 1 is a block diagram of a host device accessing a storage device over an RDMA network fabric, according to the prior art.

In this manner, the host device 302 accessing the remote storage subsystem 312 places the majority of the processing load on the host device 302, and the storage subsystem 312 no longer needs to encapsulate and decapsulates commands, perform data transfer between the host device 302 and the storage subsystem 312, generate an interrupt every time a queued command is completed, etc., and does not require a second set of submission and completion queues as was required by the prior art shown and described in FIG. 1. The result is that the processing load on the storage subsystem 312 is greatly reduced, and allowing for greater scaling of the number of host devices 302 that can access the storage subsystem 312. Potentially thousands of host devices 302 can access the storage subsystem 312 without the storage subsystem 312 causing a bottleneck.

Figure 6:
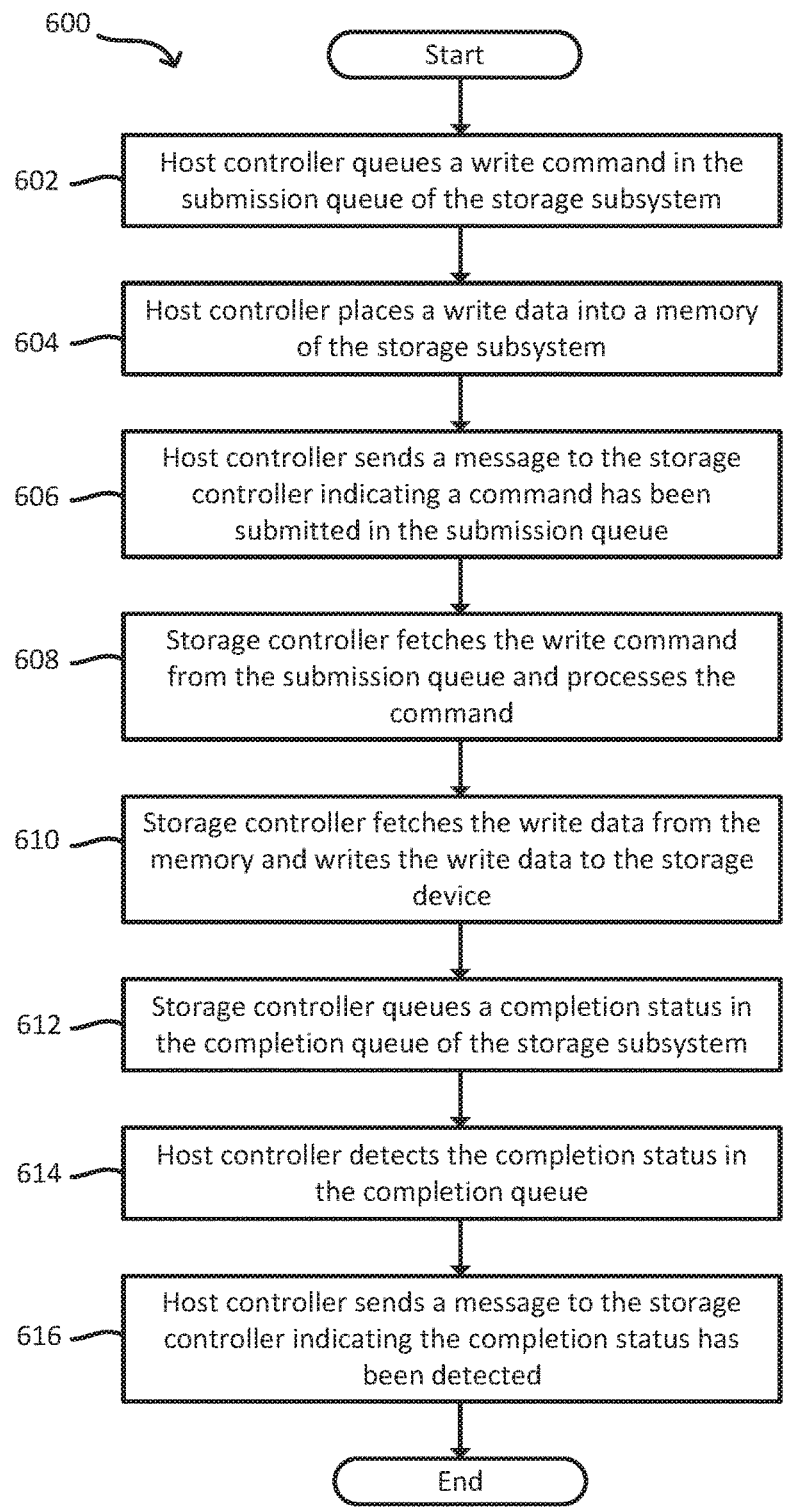
FIG. 6 is a flowchart of method steps for writing data to a remote NVMe subsystem from a host device over an RDMA network fabric, according to one embodiment of the invention.

FIG. 4 is a block diagram of a submission queue entry 400, according to one embodiment of the invention. As shown in FIG. 4, the submission queue entry (SQE) 400 is an NVMe command (as defined in chapter 4.2 of the NVMe 1.2 standard, which is herein incorporated by reference) that is 64 bytes in size and includes an Opcode 402, a namespace ID 404, a buffer address 406, and command parameters 408. FIG. 5 is a block diagram of a completion queue entry, according to one embodiment of the invention. As shown in FIG. 6, the completion queue entry (CQE) 500 is an NVMe response (as defined in chapter 4.6 of the NVMe 1.2 standard) that is 16 bytes in size and includes command parameters 502, a submission queue header pointer 504, a command status 506, and a command ID 508.

FIG. 6 is a flowchart of method steps 600 for writing data to a remote storage subsystem from a host device over an RDMA network fabric, according to one embodiment of the invention. In one embodiment, the remote storage subsystem comprises a non-volatile flash-based storage device, for example, an SSD, coupled to a storage controller via a PCIe interface, such as the storage subsystem 312 shown and described in FIG. 3. In one embodiment, the remote storage subsystem is a part of a storage appliance. The host device may comprise any suitable computer system having a memory and a memory controller, and is capable of running an operating system and executing applications writing data to the storage subsystem, such as a personal computer or workstation. While the method steps 600 are described in the context of one host device accessing the remote storage subsystem for ease of explanation, a plurality of host devices may access the remote storage subsystem in accordance with the method steps 600.

At step 602, to initiate the process for writing data to the remote storage subsystem, the host controller queues a write command in a submission queue of the storage subsystem. In one embodiment, the submission queue resides in a memory of the storage device. In another embodiment, the submission queue resides in a memory of the storage controller. At step 604, the host controller places a write data from the host memory into a memory of the storage subsystem. In one embodiment, this memory is the memory of the storage device. In another embodiment, this memory is the memory of the storage controller. In one embodiment, the host controller places the write data into the memory of the storage subsystem using an RDMA_WRITE command.

At step 606, the host controller sends a message (i.e. "rings a doorbell") to the storage controller indicating that a command has been queued in the submission queue. In one embodiment, this is accomplished by the host controller writing registers of the storage controller via RDMA. In another embodiment, this is accomplished by the host controller sending an RPC to the storage controller. At step 608, the storage controller fetches the write command from the submission queue and processes the command. At step 610, the storage controller fetches the write data from the memory of the storage subsystem and writes the write data to a persistent storage of the storage device.

At step 612, the storage controller queues a completion status in a completion queue of the storage subsystem. In one embodiment, the completion queue resides in the memory of the storage device. In another embodiment, the completion queue resides in the memory of the storage controller. At step 614, the host controller detects the completion status in the completion queue. In one embodiment, the host controller detects the completion status by polling the completion queue. In another embodiment, the host controller detects the completion status by receiving a completion message from the storage controller. Finally, at step 616, the host controller sends a message to the storage controller indicating that the completion status has been detected. In one embodiment, this can be done by writing registers of the storage controller via RDMA. In one embodiment, this can be done by sending an RPC to the storage controller.

Figure 7:
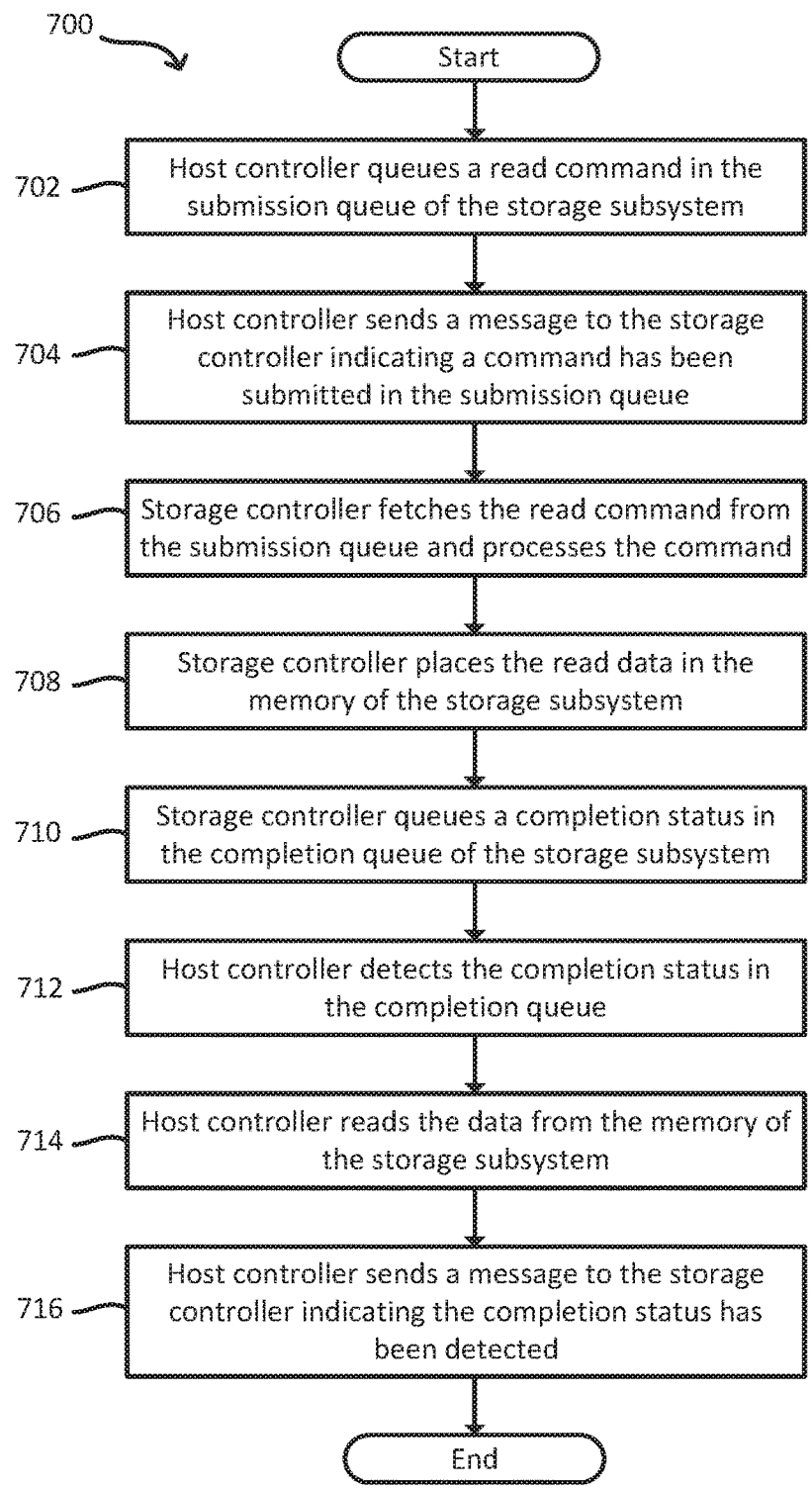
FIG. 7 is a flowchart of method steps for reading data from a remote NVMe subsystem from a host device over an RDMA network fabric, according to one embodiment of the invention.

FIG. 7 is a flowchart of method steps 700 for reading data from a remote storage subsystem from a host device over an RDMA network fabric, according to one embodiment of the invention. In one embodiment, the remote storage subsystem comprises a non-volatile flash-based storage device, for example, an SSD, coupled to an storage controller via a PCIe interface, such as the storage subsystem 312 shown and described in FIG. 3. In one embodiment, the remote storage subsystem is a part of a storage appliance. The host device may comprise any suitable computer system having a memory and a memory controller, and is capable of running an operating system and executing applications writing data to the storage subsystem, such as a personal computer or workstation. While the method steps 700 are described in the context of one host device accessing the remote storage subsystem for ease of explanation, a plurality of host devices may access the remote storage subsystem in accordance with the method steps 700.

At step 702, to initiate the process for reading data from the remote storage subsystem, the host controller queues a read command in a submission queue of the storage subsystem. In one embodiment, the submission queue resides in a memory of the storage device. In another embodiment, the submission queue resides in a memory of the storage controller. At step 704, the host controller sends a message (i.e. "rings a doorbell") to the storage controller indicating that a command has been queued in the submission queue. In one embodiment, this is accomplished by the host controller writing registers of the storage controller via RDMA. In another embodiment, this is accomplished by the host controller sending an RPC to the storage controller.

At step 706, the storage controller fetches the read command from the submission queue and processes the command. At step 708, the storage controller places a read data corresponding to the read command from a persistent memory of the storage device into a memory of the storage subsystem. In one embodiment, this memory is the memory of the storage device. In another embodiment, this memory is the memory of the storage controller. At step 710, the storage controller queues a completion status in a completion queue of the storage subsystem. In one embodiment, the completion queue resides in the memory of the storage device. In another embodiment, the completion queue resides in the memory of the storage controller.

At step 712, the host controller detects the completion status in the completion queue. In one embodiment, the host controller detects the completion status by polling the completion queue. In another embodiment, the host controller detects the completion status by receiving a completion message from the storage controller. At step 714, the host controller reads the read data from the memory of the storage subsystem. In one embodiment, this is done using an RDMA_READ command. Finally, at step 716, the host controller sends a message to the storage controller indicating that the completion status has been detected. In one embodiment, this can be done by writing registers of the storage controller via RDMA. In one embodiment, this can be done by sending an RPC to the storage controller.

By writing to and reading from the remote storage subsystem according to the method steps 600 and 700 shown in FIGS. 6 and 7, respectively, the processing load on the remote storage subsystem is reduced, allowing for a greater number of host devices to access the remote storage subsystem without the storage system running out of processing bandwidth and becoming a bottleneck as is the case with prior art NVMe over fabric implementations.

Figure 8:
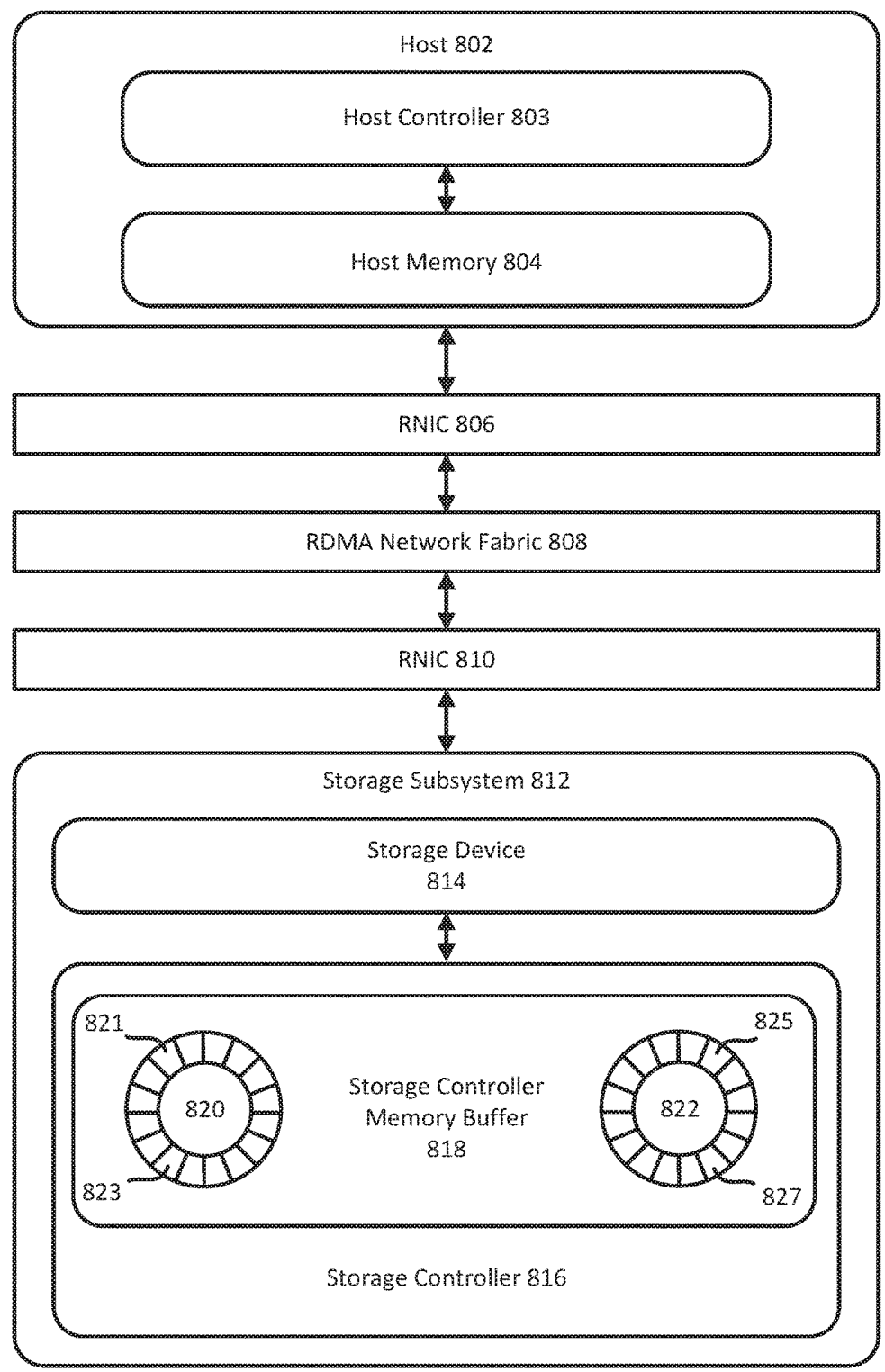
FIG. 8 is a block diagram of a host device accessing a remote NVMe subsystem over an RDMA network fabric, according to another embodiment of the invention.

FIG. 8 is a block diagram of a host device 802 accessing a remote storage subsystem 812 over an RDMA network fabric 808, according to another embodiment of the invention. As shown in FIG. 8, the host device 802 includes a host controller 803 coupled to a host memory 804. On either side of the RDMA network fabric 808 is an RNIC 806 (host device 802 side) and an RNIC 810 (storage subsystem 812 side) to facilitate direct transfer of data between the host device 802 and the storage subsystem 812 over the RDMA network fabric 808. The host device 802 may comprise any suitable computer system having an operating system running applications reading and writing data to the storage subsystem 812, such as a personal computer or workstation. As with FIG. 3, for simplicity, only one host device 802 is shown in FIG. 8. In other embodiments, a plurality of host devices 802 may be connected to the storage subsystem 812, as illustrated in FIG. 2, for example.

The storage subsystem 812 includes a storage device 814 communicatively coupled to a storage controller 816. The storage controller 816 includes a memory buffer 818 having a submission queue 820 with a head register 821 and a tail register 823, and a completion queue 822 with a head register 825 and a tail register 827. In one embodiment, the storage controller 816 is communicatively coupled to the storage device 814 via a PCIe interface. The storage device 814 may comprise any suitable non-volatile flash-based storage media. In one embodiment, the storage device 814 is an SSD. In one embodiment, the storage device 814 is capable of operating according to the NVMe standard. The storage subsystem 812 can be a part of a storage appliance, such as the storage appliance 220 shown in FIG. 2.

The host device 802 access the remote storage subsystem 812 in a similar manner as described in connection with FIG. 3. However, the read or write commands are now queued in the submission queue 820 of the storage controller memory buffer 818, the completion status is detected from the completion queue 822 of the storage controller memory buffer 818, and the write data and read data are written to and read from, respectively, the storage controller memory buffer 818. As with FIG. 3, the host device 802 remains responsible for the majority of the processing load when writing to and reading from the remote storage subsystem 812, allowing for greater scaling of the number of host devices 802 that can access the remote storage subsystem 812.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A host device capable of being connected to a remote storage subsystem separate from the host device via network interfaces connected to a data communications network topology, the host device comprising:
 a host controller communicatively coupled to a host memory, wherein
  the host controller is configured to
  queue a write command or a read command in a submission queue of the remote storage subsystem,
  transmit a message to the remote storage subsystem indicating the write command or the read command has been submitted in the submission queue,
  cause the host memory to place a write data into a memory of the remote storage subsystem,
  detect a command completion status from a completion queue of the remote storage subsystem,
  obtain a read data from the memory of the remote storage subsystem, and
  transmit a message to the remote storage subsystem indicating the command completion status has been detected.

2. The host device of claim 1, wherein the host controller detects the command completion status by polling the completion queue.

3. The host device of claim 1, wherein the host controller detects the command completion status by receiving a completion message from the remote storage subsystem.

4. The host device of claim 1, wherein the host controller transmits the messages to the remote storage subsystem by writing registers of the remote storage subsystem.

5. The host device of claim 1, wherein the host controller transmits the messages to the remote storage subsystem using a Remote Procedure Call (RPC).

6. The host device of claim 1, wherein the data communications network topology comprises a Remote Direct Memory Access (RDMA) network fabric.

7. A remote storage subsystem capable of being connected to a host device separate from the remote storage subsystem via network interfaces connected to a data communications network topology, the remote storage subsystem comprising:
 a storage controller communicatively coupled to a storage device having a memory, wherein the storage controller is configured to
  receive a message indicating a pending read or write command has been queued in a submission queue of the remote storage subsystem from the host device,
  fetch the write command or the read command from the submission queue of the remote storage subsystem,
  process the write command by writing a write data to the storage device,
  process the read command by placing a read data into the memory of the storage device,
  update a completion queue of the remote storage subsystem with a command completion status after processing the write command or the read command, and
  receive a message indicating the command completion status has been detected by the host device.

8. The remote storage subsystem of claim 7, wherein the storage controller is further configured to send a completion message to the host device after processing the write command or read command.

9. The remote storage subsystem of claim 7, wherein the submission queue and the completion queue reside in the memory of the storage device.

10. The remote storage subsystem of claim 7, wherein the submission queue and the completion queue reside in a memory buffer of the storage controller.

11. The remote storage subsystem of claim 7, wherein the memory of the storage device is a memory buffer of the storage controller.

12. The remote storage subsystem of claim 7, wherein the messages comprise a register write.

13. The remote storage subsystem of claim 7, wherein the messages comprise a Remote Procedure Call (RPC).

14. The remote storage subsystem of claim 7, wherein the data communications network topology comprises a Remote Direct Memory Access (RDMA) network fabric.

15. The remote storage subsystem of claim 7, wherein the storage device is capable of operating according to the Non-Volatile Memory Express (NVMe) standard.

16. The remote storage subsystem of claim 7, wherein the storage device is communicatively coupled to the storage controller via a PCI Express (PCIe) interface.

17. A method of accessing a remote storage subsystem from a host device separate from the remote storage subsystem and connected via network interfaces connected to a data communications network topology, the method comprising:
 queueing a write command or a read command in a submission queue of the remote storage subsystem;
 placing a write data into a memory of the remote storage subsystem;
 retrieving a read data from the memory of the remote storage subsystem;
 transmitting a message to the remote storage subsystem indicating the write command or the read command has been submitted in the submission queue;
 detecting a command completion status from a completion queue of the remote storage subsystem; and
 transmitting a message to the remote storage subsystem indicating the command completion status has been detected.

18. The method of claim 17, further comprising:
receiving a completion message from the remote storage subsystem indicating that the write command has been processed.

19. The method of claim 17, wherein detecting the command completion status comprises polling the completion queue.

20. The method of claim 17, wherein detecting the command completion status comprises receiving a completion message from the remote storage subsystem.

21. The method of claim 17, wherein transmitting the messages comprises writing registers of the remote storage subsystem.

22. The method of claim 17, wherein transmitting the messages comprises sending a remote procedure call to the remote storage subsystem.

23. The method of claim 17, wherein the data communications network topology comprises a Remote Direct Memory Access (RDMA) network fabric.

24. The host of device of claim 1, wherein the remote storage subsystem is not configured to obtain write data from the host memory or place read data in the host memory.

25. The remote storage subsystem of claim 7, wherein the remote storage subsystem is not configured to obtain write data from the host memory or place read data in the host memory.

26. The method of claim 17, wherein the method does not comprise the remote storage subsystem placing read data to the host memory or retrieving write data from the host memory.

* * * * *